(12) United States Patent
Kim (10) Patent No.: US 12,013,058 B2
(45) Date of Patent: Jun. 18, 2024

(54) METHOD OF MANUFACTURING PIPE PACKING

(71) Applicant: HI-STEN CO., LTD., Gimhae-si (KR)

(72) Inventor: Kuk Jin Kim, Gimhae-si (KR)

(73) Assignee: HI-STEN CO., LTD., Gimhae-si (KR)

( * ) Notice: Subject to any disclaimer, the term of this patent is extended or adjusted under 35 U.S.C. 154(b) by 434 days.

(21) Appl. No.: 16/764,082

(22) PCT Filed: Jun. 21, 2019

(86) PCT No.: PCT/KR2019/007508
§ 371 (c)(1),
(2) Date: May 10, 2022

(87) PCT Pub. No.: WO2020/246653
PCT Pub. Date: Dec. 10, 2020

(65) Prior Publication Data
US 2022/0333720 A1    Oct. 20, 2022

(30) Foreign Application Priority Data

Jun. 3, 2019    (KR) .......................... 10-2019-0065347

(51) Int. Cl.
*B29C 45/26* (2006.01)
*F16L 21/02* (2006.01)
*B29L 31/26* (2006.01)

(52) U.S. Cl.
CPC .............. *F16L 21/02* (2013.01); *B29C 45/26* (2013.01); *B29L 2031/265* (2013.01)

(58) Field of Classification Search
CPC . B29C 45/26; B29C 45/641; B29L 2031/265; F16L 21/02
See application file for complete search history.

(56) References Cited

FOREIGN PATENT DOCUMENTS

| KR | 20-0425952 Y1 | 9/2006 |
|---|---|---|
| KR | 10-0974605 B1 | 8/2010 |

*Primary Examiner* — Ryan M Ochylski
(74) *Attorney, Agent, or Firm* — Innovation Counsel LLP

(57) ABSTRACT

The present inventive concept relates to a method of manufacturing a pipe packing inserted into a housing having a hollow body shape to prevent fluid flowing inside a pipe from leaking to the outside, the method including: manufacturing the pipe packing by injecting molten rubber into a mold assembly having an outer mold and an inner mold, wherein the pipe packing is configured as a hollow body and comprises an outer circumferential part located outside of the pipe relative thereto, opposite surfaces provided in directions toward a middle of the pipe packing at opposite ends of the outer circumferential part, and an inner circumferential part provided toward a center portion of the opposite surfaces therefrom, wherein the inner circumferential part has a gap provided therein to be divided into opposite inner circumferential parts.

1 Claim, 7 Drawing Sheets

METHOD OF MANUFACTURING PIPE PACKING

CROSS-REFERENCE TO RELATED APPLICATIONS

This application claims priority to and the benefit of Korean Patent Application No. 10-2019-0065347, filed on Jun. 3, 2019 and PCT Application No. PCT/KR2019/007508, filed on Jun. 21, 2019, the entire contents of which are incorporated herein by reference.

BACKGROUND

The present inventive concept relates generally to a method of manufacturing a pipe packing having a hollow body shape inserted into a housing having a hollow body shape to receive a pipe to a hollow hole of the inside of the housing so that fluid flowing inside a pipe is prevented from leaking to the outside. More particularly, the present inventive concept relates to a method of manufacturing a pipe packing, wherein a curved part is formed at each of opposite ends of a body of the packing having the hollow body shape by protruding therefrom toward a center portion of the inside of the body, and a fluid-receiving part, which is a space receiving fluid, is formed between the curved part and the inner surface of the body.

Generally, a packing member is made of synthetic rubber or resin and used to prevent fluid in the coupling or valve for connecting pipes from leaking to the outside.

As a prior art of such a packing member, "Packing for connecting pipes" is disclosed in Korean Patent No. 10-0974605, which is a packing for connecting ring-shaped pipes for sealing between a female pipe and male pipe by being inserted therebetween, the packing including ring groove parts provided in an inner circumferential surface thereof by being intermittently disconnected and a ring surface part having a predetermined length provided between the ring groove parts along a circumferential direction thereof and having the same surface as the inner circumferential surface of the packing, wherein the ring surface part is provided in plural throughout the circumferential direction along the ring groove parts, each of the ring surface parts being arranged at a predetermined interval, and the ring groove parts are provided in plural at equal intervals along the axial direction of the packing, wherein the ring surface parts of the ring groove parts are arranged alternately in a zigzag shape with ring surface parts adjacent thereto.

As another prior art, "Rubber-packing for pipes connection" is disclosed in Korean Utility Model Registration No. 20-0425952. The packing, which is a watertight packing for each of the pipes, is inserted and mounted between a pair of connecting pipes, each of the pair of connecting pipes being mounted to an end part of a side of each of a pair of pipes and an outer circumferential surface of which is connected to the packing by a connecting joint during the connection of the pair of the pipes, the watertight packing including: a fastening part inserted into and mounted to a side surface of any one pipe selected from the pair of pipes, a sectional shape of which is formed in an arrow shape, and having a circular ring shape; an outer watertight part is located at an end portion of a side of the fastening part, a sectional shape of which is formed in a rectangular shape, and having a circular ring shape; an inner watertight part located inside the outer watertight part, a sectional shape of which is formed in a rectangular shape narrower in width than the outer watertight part, and having a circular ring shape; and a watertight jaw part located inside the inner watertight part, a sectional shape of which is formed in an inverted "V" shape.

However, most of the prior packing members are designed in various shapes to prevent fluid leakage from the inside of the pipe. However, once the leakage starts, the leakage increases as time passes, and the function of the packing is completely lost.

SUMMARY

The present inventive concept has been made to solve the above problems occurring in the prior art, and is intended to provide a pipe packing and a method of manufacturing the pipe packing, which includes a fluid-receiving part receiving fluid leaked during leakage of fluid from a pipe such that fluid initially leaked from the pipe is received in the fluid-receiving part to increase watertightness of the packing.

The present inventive concept relates to a pipe packing and a method of manufacturing the pipe packing inserted into a housing having a hollow body shape to prevent fluid flowing inside of a pipe from leaking to the outside, the method including:

manufacturing a pipe packing by injecting molten rubber into a mold assembly having an outer mold and an inner mold, wherein the pipe packing is configured as a hollow body and comprises an outer circumferential part located outside of the pipe relative thereto, opposite surfaces and provided in directions toward a middle of the packing at opposite ends of the outer circumferential part, and an inner circumferential part provided toward a center portion of the opposite surfaces and therefrom, wherein the inner circumferential part has a gap 1 provided therein to be divided into opposite inner circumferential parts, so entering and exiting of the fluid are performed through the gap 1.

As described above, the watertight pipe packing member of the present inventive concept includes a fluid-receiving part, which is a space receiving fluid leaked initially, so that fluid is not leaked to the outside. In addition, pressure of the fluid-receiving part is increased by the initially leaked fluid received in the fluid-receiving part to increase watertightness of the packing. Accordingly, fluid can be prevented from leaking continuously, and the watertightness can be more efficiently maintained due to the fluid-receiving part formed at opposite ends of the packing.

DETAILED DESCRIPTION

Figure 1:
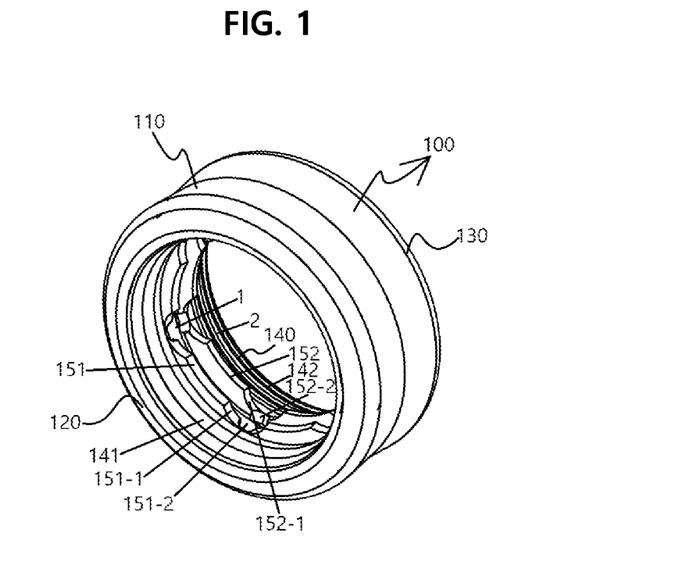
FIG. 1 is a perspective view of a pipe packing of the present inventive concept.
Figure 2:
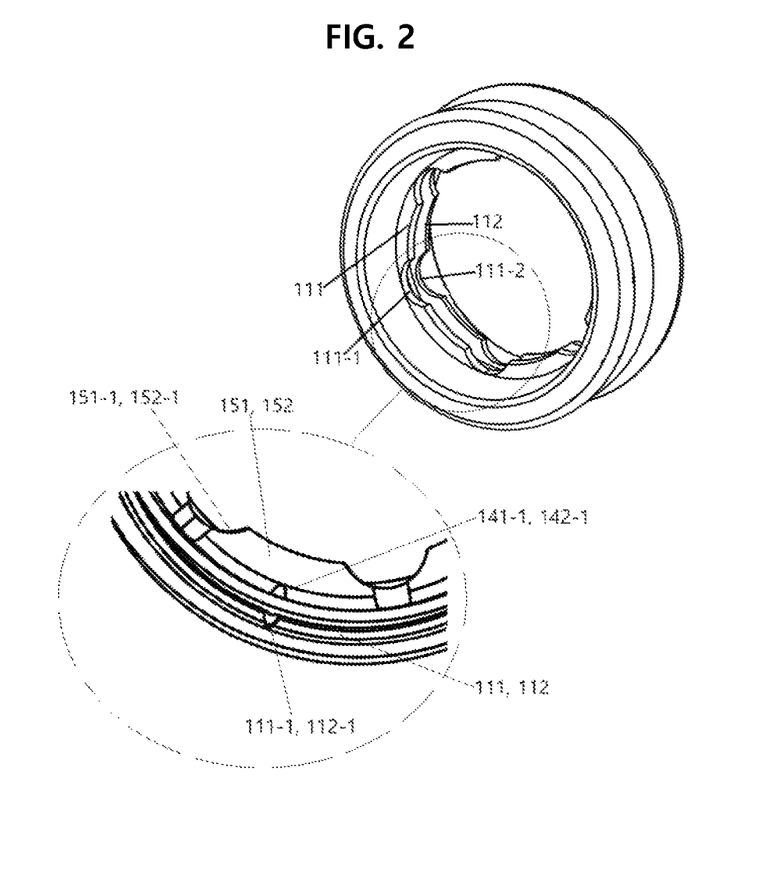
FIG. 2 is an inner perspective view of the pipe packing of the present inventive concept.

The present inventive concept relates to a pipe packing and a method of manufacturing a pipe packing which is configured to be inserted into a housing. The pipe packing has a hollow body shape to prevent fluid flowing inside the pipe from leaking to the outside. The method including manufacturing a pipe packing 100 by injecting molten rubber into a mold assembly 3000, wherein the pipe packing 100 is configured as a hollow body and comprises an outer circumferential part 110 substantially extending along a first direction and configured to be disposed outside of the pipe, opposite surfaces 120 and 130 extending substantially perpendicular to the first direction from opposing distal ends of the outer circumferential part 110 in a second direction substantially perpendicular to the first direction toward a center of the pipe packing 100, respectively, and an inner circumferential part 140 extending substantially parallel to the first direction toward a middle of the pipe packing 100. The inner circumferential part 140 including a first inner circumferential part 141 and a second circumferential part 142 extending from distal ends of the opposite surfaces 120 and 130, wherein the first inner circumferential part 141 and the second circumferential part 142 facing each other with a gap 1 formed between the first inner circumferential part 141 and the second inner circumferential part 142, the first inner circumferential part 141 and the second inner circumferential part 142 facing each other with a gap 1 disposed between the first inner circumferential part 141 and the second inner circumferential part 142, the outer circumferential part 110, the opposite surfaces 120 and 130 and inner circumferential parts 140 (141 and 142) forming a fluid-receiving part surrounding the pipe to be packed, the fluid flowing through the pipe flows into the fluid-receiving part through the gap 1, the outer circumferential part 110 is symmetrical with respect to a center portion of the pipe packing 100, a diameter of the outer circumferential part 110 becoming smaller in diameter toward the middle portion of the outer circumferential part 110 from opposite sides thereof, and having an inclination surface at each of the opposite sides, and opposite protruding jaws 111 and 112 are provided in the directions toward a middle of the pipe packing 100 on an inner wall surface of the outer circumferential part 110, so each of ends of the opposite protruding jaws 111 and 112 is in contact with an inner wall surface of the inner circumferential part 140.

In addition, the outer circumferential part 110 is symmetrical relative to the center portion of the pipe packing 100, a diameter thereof becoming smaller toward the center portion of the pipe packing 100 from opposite sides thereof, and has an inclination surface at each of the opposite sides.

Furthermore, the opposite protruding jaws 111 and 112 are provided inside of an inner wall surface of the outer circumferential part 110, so each of ends of the opposite protruding jaws 111 and 112 is in contact with an inner wall surface of the inner circumferential part 140 when the pipe packing 100 is installed outside of the pipe.

In addition, the opposite inner circumferential parts 141 and 142 are symmetrical to each other with respect to a center line which intersect the center portion of the pipe packing 100.

Furthermore, a step 2 is formed on an outer surface of each of the opposite inner circumferential parts 141 and 142, and has an inclination surface formed to become larger in diameter in an outward direction from the center portion. Accordingly, when a pipe is inserted into the pipe packing 100, the inclination surface prevents each of the opposite inner circumferential parts 141 and 142 from being folded in the outward direction.

Additionally, end parts of the opposite inner circumferential parts 141 and 142 have opposite support pieces 151 and 152, respectively, which protrude substantially perpendicular to the opposite inner circumferential parts 141 and 142 in the directions toward a center of the pipe packing 100, so outer surfaces of the opposite support pieces 151 and 152 support ends of opposing pipes which are configured to be inserted into the pipe packing 100.

In addition, the opposite support pieces 151 and 152 have semicircular horizontal holes 151-1 and 152-1 formed respectively to be spaced apart by a predetermined interval from each other along circumferential directions thereof in end portions thereof, and semicircular perpendicular holes 151-2 and 152-2 which are smaller than the semicircular horizontal holes 151-1 and 152-1 are also formed in directions which are perpendicular to the semicircular horizontal holes 151-1 and 152-1. Accordingly, although the opposing pipes inserted into the body of the pipe packing 100 come into contact with the surfaces of the opposite support pieces 151 and 152, side surfaces of the semicircular horizontal holes 151-1 and 152-1 are in contact with each other to form a large circular hole, and the semicircular perpendicular holes 151-2 and 152-2 are also in contact with each other to form a small circular hole so that fluid is easily introduced into a fluid-receiving part.

Additionally, the semicircular perpendicular holes 151-2 and 152-2 is configured to form a circular hole when the opposing pipes are inserted into the body of the pipe packing 100.

Furthermore, each of the multiple semicircular horizontal holes 151-1 and 152-1 is formed to be spaced apart by a predetermined interval from each other along the circumferential direction of each of the opposite support pieces.

In addition, first opposite flow passage holes 111-1 and 111-2, which communicate with the fluid-receiving part, are formed in the end parts of the opposite protruding jaws 111 and 112, respectively, so that fluid is easily introduced to the fluid-receiving part although end parts of the opposite protruding jaws 111 and 112 formed by protruding in the directions toward a center of the pipe packing 100 from an inner wall surface of the outer circumferential part 110 of the body are in contact with inner surfaces of the opposite inner circumferential parts 141 and 142, which are inner surfaces of the body, due to the opposing pipes inserted into the body of the pipe packing 100.

Furthermore, each of the first opposite flow passage holes 111-1 and 111-2 is formed in a semicircular shape.

In addition, the second opposite flow passage holes 141-1 and 142-1 having semicircular shapes corresponding to the first opposite flow passage holes 111-1 and 111-2 of the opposite protruding jaws 111 and 112 are formed in the inner surfaces of the opposite inner circumferential parts 141 and 142, respectively. Accordingly, when the opposing pipes are inserted into the pipe packing 100, the opposing pipes come into contact with the opposite protruding jaws 111 and 112. The first opposite flow passage holes 111-1 and 111-2 of the opposite protruding jaws 111 and 112 and the second opposite flow passage holes of the inner surfaces of the opposite inner circumferential parts 141 and 142 form a circular shape when the opposing pipes are inserted into the pipe packing 100.

Furthermore, the multiple first opposite flow passage holes 111-1 and 111-2 and the multiple second opposite flow passage holes 141-1 and 142-1 are formed to be spaced apart by predetermined distances from each other along a circumferential direction of each of the inner surfaces of the opposite protruding jaws 111 and 112 and the opposite inner circumferential parts 141 and 142.

Additionally, the first opposite flow passage holes 111-1 and 111-2 formed in the opposite protruding jaws 111 and 112 are configured to have a shape of a circular hole when the opposing pipes are inserted into the pipe packing 100.

In addition, when fluid flowing inside the opposing pipe leaks and is introduced to the fluid-receiving part through the first opposite flow passage holes 111-1 and 111-2, high fluid pressure is formed inside the fluid-receiving part such that the opposite inner circumferential parts 141 and 142 are in close contact with the outer surface of the opposing pipes firmly, thereby making the pipe watertight.

Hereinbelow, the present inventive concept will be described in detail with reference to accompanying drawings.

Figure 3:
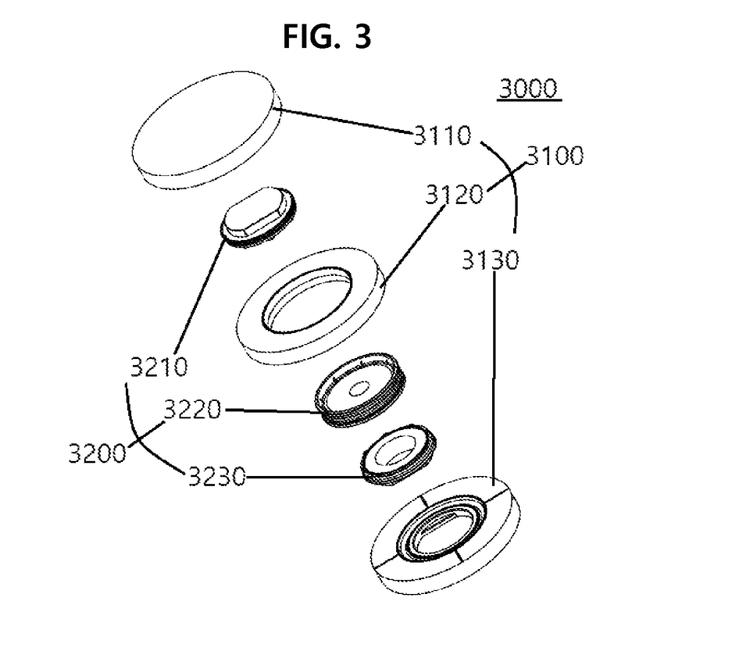
FIG. 3 is an exploded perspective view of a mold assembly for manufacturing the pipe packing of the present inventive concept.
Figure 4:
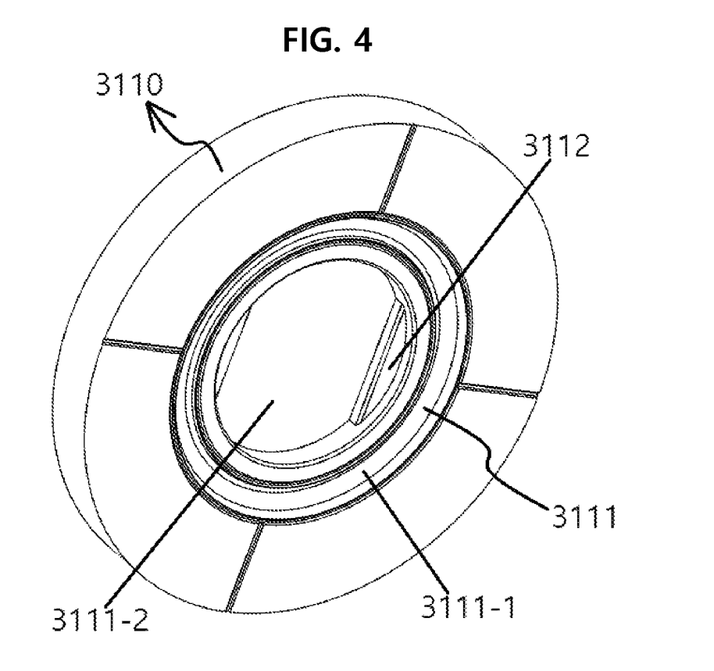
FIG. 4 is a perspective view of an upper outer mold of the mold assembly for manufacturing the pipe packing of the present inventive concept.
Figure 5:
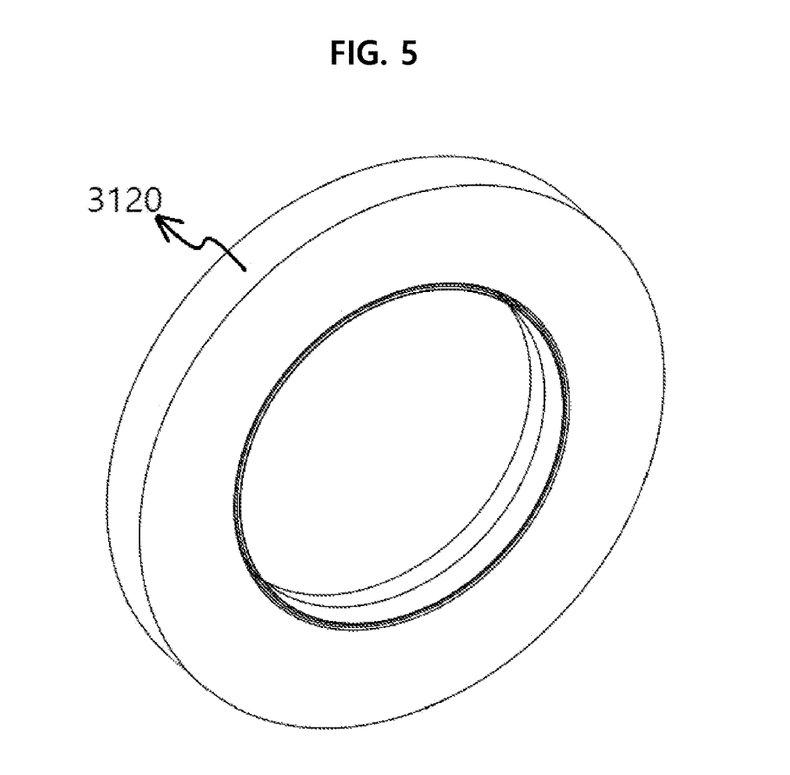
FIG. 5 is a perspective view of a middle outer mold of the mold assembly for manufacturing the pipe packing of the present inventive concept.
Figure 6:
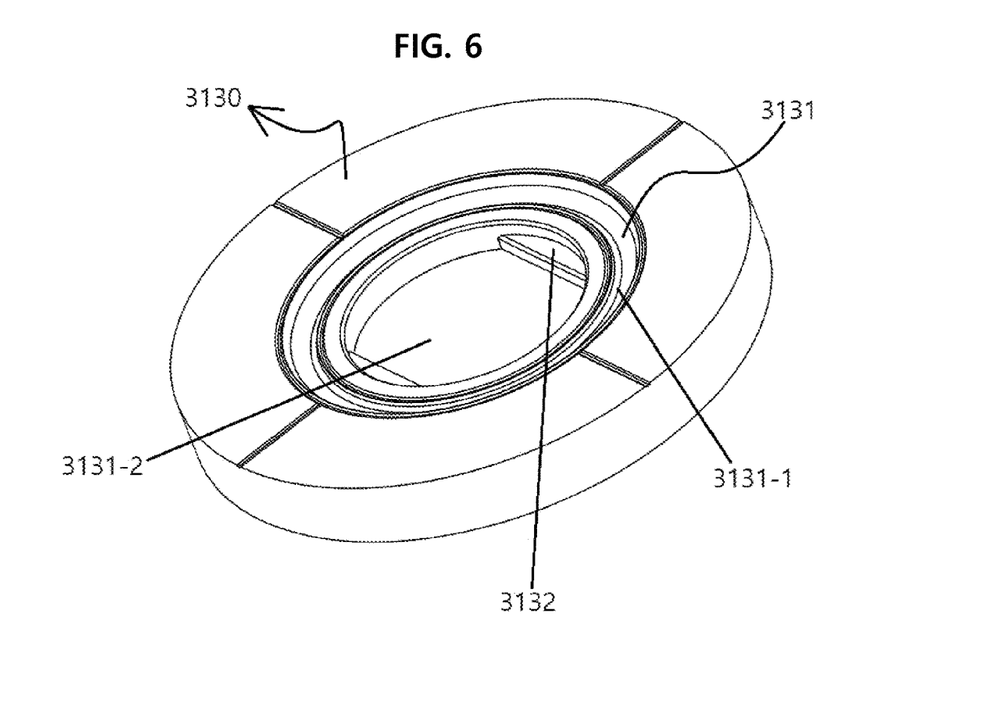
FIG. 6 is a perspective view of a lower outer mold of the mold assembly for manufacturing the pipe packing of the present inventive concept.
Figure 7:
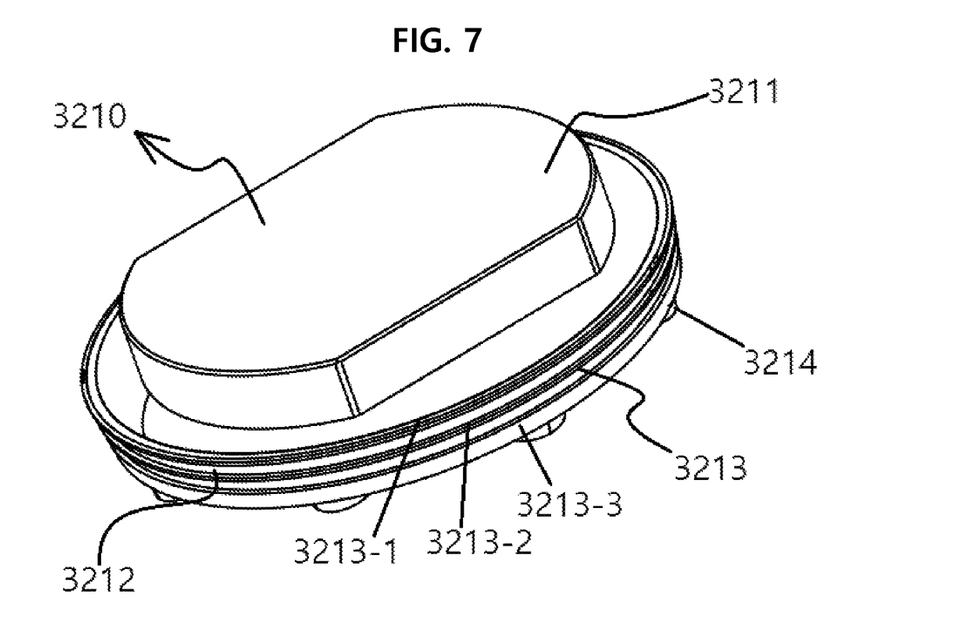
FIG. 7 is a perspective view of an upper inner mold of the mold assembly for manufacturing the pipe packing of the present inventive concept.
Figure 8:
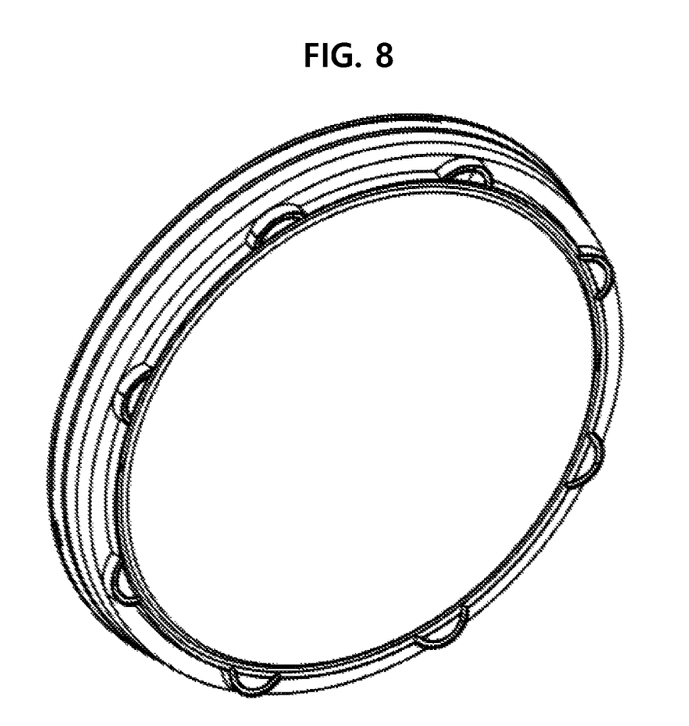
FIG. 8 is a perspective view of a lower surface of the upper inner mold of the mold assembly for manufacturing the pipe packing of the present inventive concept.
Figure 9:
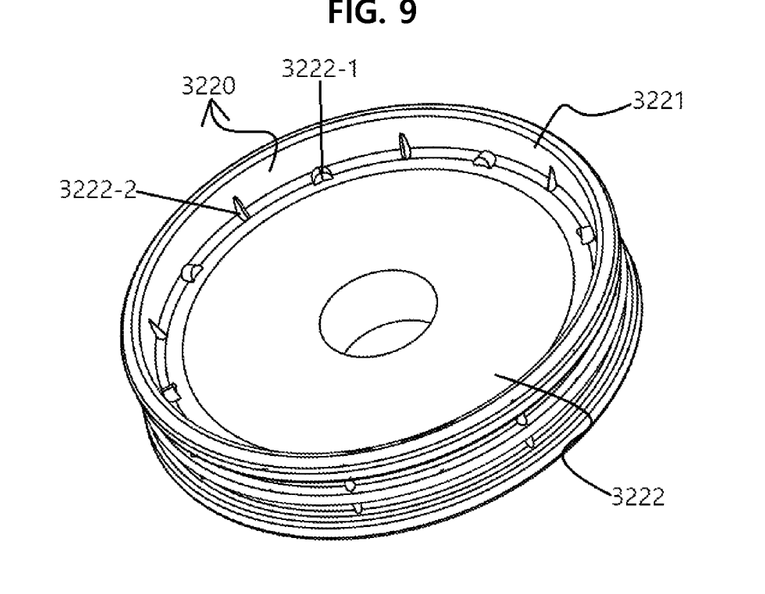
FIG. 9 is a perspective view of a middle inner mold of the mold assembly for manufacturing the pipe packing of the present inventive concept.
Figure 10:
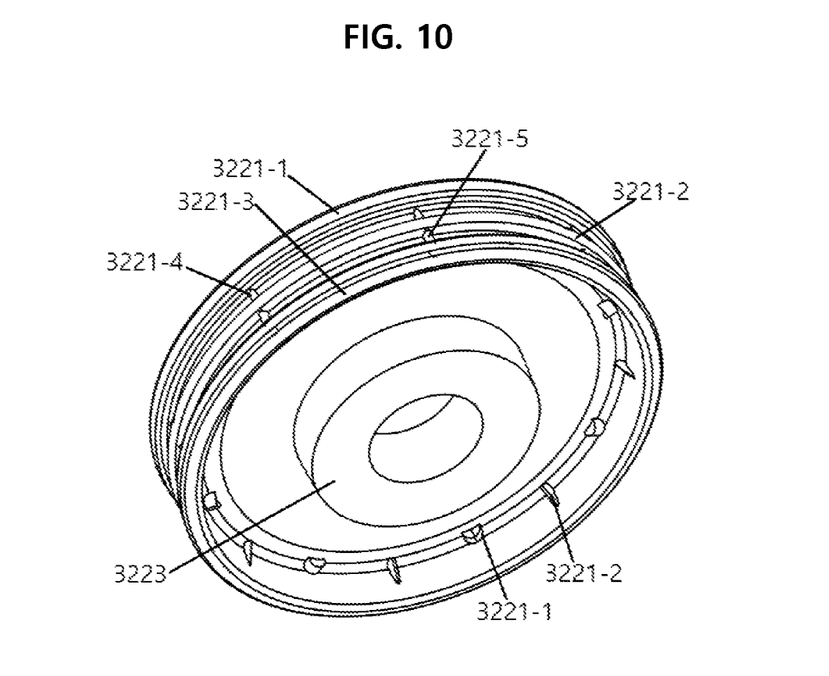
FIG. 10 is a perspective view of a lower surface of the middle inner mold of the mold assembly for manufacturing the pipe packing of the present inventive concept.
Figure 11:
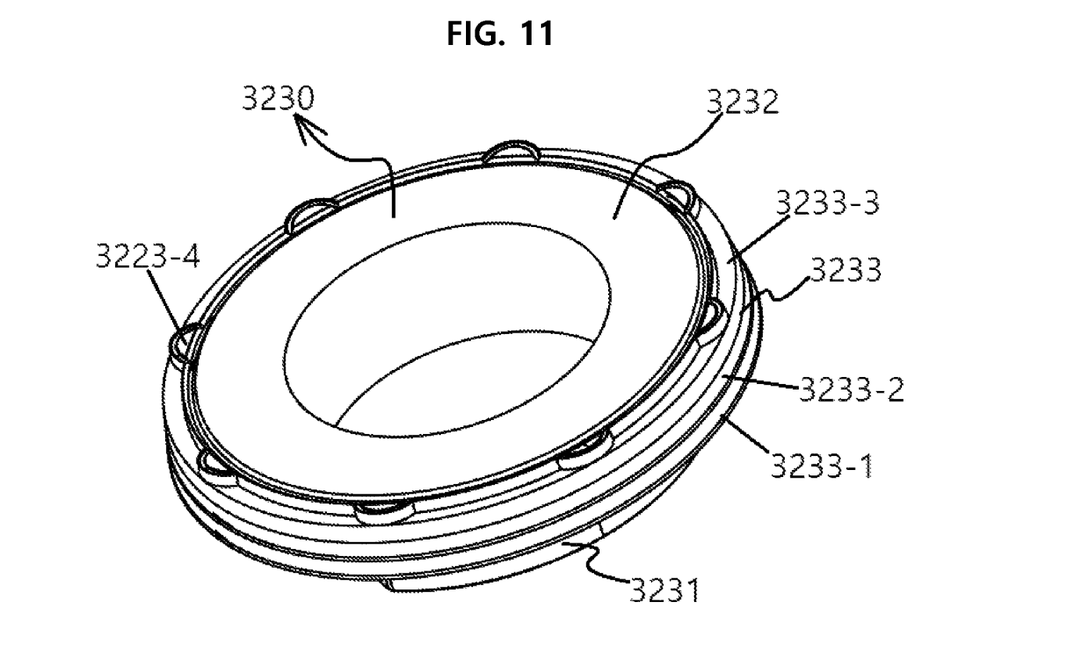
FIG. 11 is a perspective view of a lower inner mold of the mold assembly for manufacturing the pipe packing of the present inventive concept.
Figure 12:
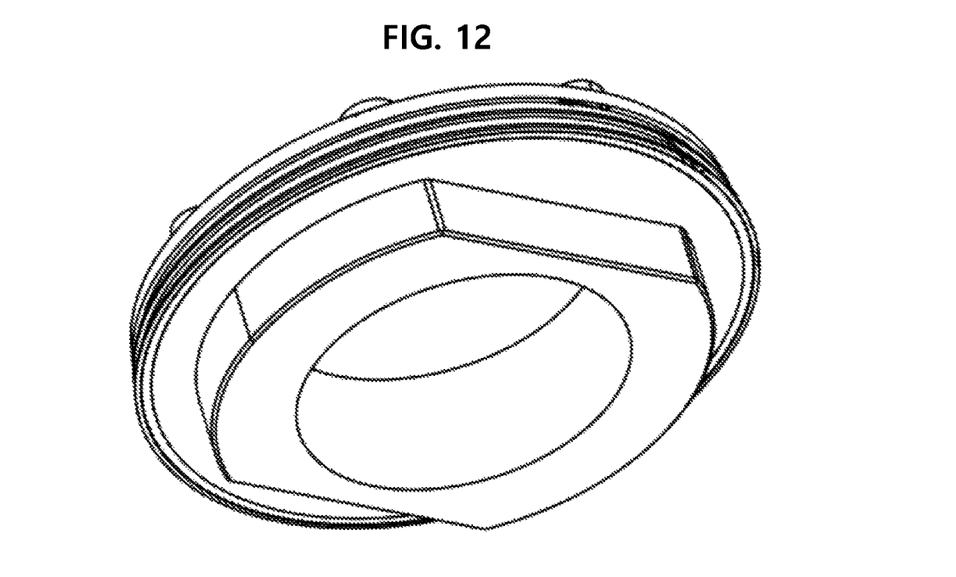
FIG. 12 is a perspective view of a lower surface of the lower inner mold of the mold assembly for manufacturing the pipe packing of the present inventive concept.
Figure 13:
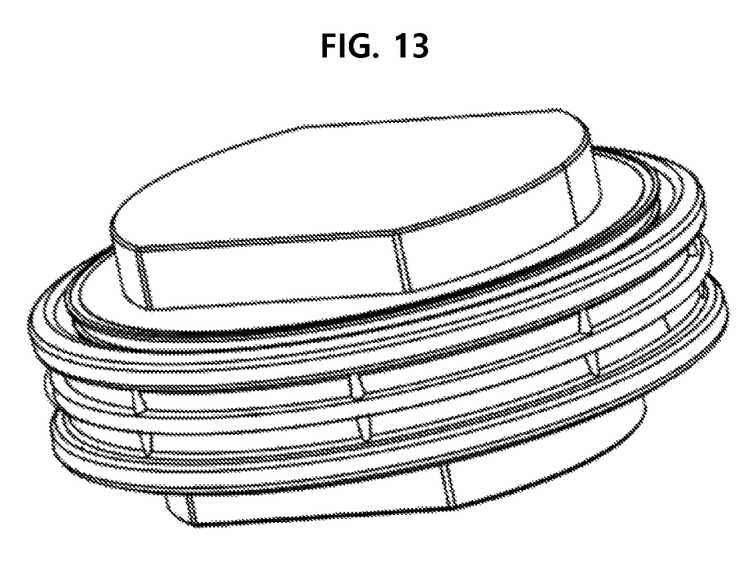
FIG. 13 is a perspective view illustrating a combined state of an inner mold of the mold assembly for manufacturing the pipe packing of the present inventive concept.

FIG. 1 is a perspective view of the pipe packing of the present inventive concept, FIG. 2 is an inner perspective view of the pipe packing of the present inventive concept, FIG. 3 is an exploded perspective view of the mold assembly for manufacturing the pipe packing of the present inventive concept, FIG. 4 is a perspective view of an upper outer mold of the mold assembly for manufacturing the pipe packing of the present inventive concept, FIG. 5 is a perspective view of a middle outer mold of the mold assembly for manufacturing the pipe packing of the present inventive concept, FIG. 6 is a perspective view of a lower outer mold of the mold assembly for manufacturing the pipe packing of the present inventive concept, FIG. 7 is a perspective view of an upper inner mold of the mold assembly for manufacturing the pipe packing of the present inventive concept, FIG. 8 is a perspective view of a lower surface of the upper inner mold of the mold assembly for manufacturing the pipe packing of the present inventive concept, FIG. 9 is a perspective view of a middle inner mold of the mold assembly for manufacturing the pipe packing of the present inventive concept, FIG. 10 is a perspective view of a lower surface of the middle inner mold of the mold assembly for manufacturing the pipe packing of the present inventive concept, FIG. 11 is a perspective view of a lower inner mold of the mold assembly for manufacturing the pipe packing of the present inventive concept, FIG. 12 is a perspective view of a lower surface of the lower inner mold of the mold assembly for manufacturing the pipe packing of the present inventive concept, and FIG. 13 is a perspective view illustrating a combined state of an inner mold of the mold assembly for manufacturing the pipe packing of the present inventive concept.

The present inventive concept relates to a pipe packing and a method of manufacturing a pipe packing having a hollow body shape inserted into the housing having a hollow body shape so that fluid flowing in a pipe is prevented from leaking to the outside.

The method of manufacturing a pipe packing which is configured to be inserted into a housing. The pipe packing has a hollow body shape to prevent fluid flowing inside the pipe from leaking to the outside. The method comprising manufacturing a pipe packing 100 by injecting molten rubber into the mold assembly 3000, wherein the pipe packing 100 is configured as a hollow body and comprises the outer circumferential part 110 substantially extending along a first direction and configured to be located outside of the pipe, the opposite surfaces 120 and 130 extending from opposite ends of the outer circumferential part 110 in a second direction substantially perpendicular to the first direction toward a center of the pipe packing 100, respectively, and the inner circumferential part 140 extending substantially parallel to the first direction toward the center portion of the pipe packing 100. The inner circumferential part 140 including a first inner circumferential part 141 and a second circumferential part 142 extending from distal ends of the opposite surfaces 120 and 130, wherein the first inner circumferential part 140 and the second inner circumferential part 142 facing each other with a gap 1 disposed between the first inner circumferential part 141 and the second inner circumferential part 142. The outer circumferential part 110, the opposite surfaces 120 and 130 and inner circumferential parts 140 (141 and 142) forming a fluid-receiving part surrounding the pipe to be packed. The fluid flowing through the opposing pipes may flows into the fluid-receiving part through the gap 1. The outer circumferential part 110 is symmetrical relative to the center portion of the pipe packing 100, a diameter of the outer circumferential part 110 becoming smaller in diameter toward the center portion of the outer circumferential part 110 from opposite sides thereof, and has the inclination surface at each of the opposite sides. The opposite protruding jaws 111 and 112 are provided inside of an inner wall surface of the outer circumferential part 110, so each of ends of the opposite protruding jaws 111 and 112 is configured to be in contact with an inner wall surface of the inner circumferential part 140 when the pipe packing 100 is installed outside of the opposing pipes.

The outer circumferential part 110 is symmetrical with respect to the middle portion of the outer circumferential part 110, a diameter thereof becoming smaller toward the middle portion of the outer circumferential part 110 from opposite sides thereof, and has the inclination surface at each of the opposite sides.

The opposite protruding jaws 111 and 112 are provided inside of an inner wall surface of the outer circumferential part 110, so each of ends of the opposite protruding jaws 111 and 112 is in contact with an inner wall surface of the inner circumferential part 140.

The opposite inner circumferential parts 141 and 142 are symmetrical to each other with respect to the middle portion of the pipe packing 100.

The step 2 is formed on an outer surface of each of the opposite inner circumferential parts 141 and 142, and has the inclination surface formed to become larger in diameter in an outward direction from the center portion. Accordingly, when opposing pipes are inserted into the pipe packing 100, the inclination surface prevents each of the opposite inner circumferential parts 141 and 142 from being folded in the outward direction.

The end parts of the opposite inner circumferential parts 141 and 142 have opposite support pieces 151 and 152, respectively, protruding substantially perpendicular to the opposite inner circumferential parts 141 and 142 in the directions toward a center of the pipe packing 100 along the second direction, so outer surfaces of the opposite support pieces 151 and 152 support ends of opposing pipes which are configured to be inserted into the pipe packing 100.

The opposite support pieces 151 and 152 have semicircular horizontal holes 151-1 and 152-1 formed respectively to be spaced apart by a predetermined interval from each other along circumferential directions thereof in end portions thereof, and the semicircular perpendicular holes 151-2 and 152-2, which are smaller than the semicircular horizontal holes 151-1 and 152-1, are also formed in directions, which are perpendicular to the semicircular horizontal holes 151-1 and 152-1. Accordingly, although the opposing pipes inserted into the body of the pipe packing 100 come into contact with the surfaces of the opposite support pieces 151 and 152, the side surfaces of the semicircular horizontal holes 151-1 and 152-1 are in contact with each other to form a large circular hole, and the semicircular perpendicular holes 151-2 and 152-2 are also in contact with each other to form a small circular hole so that fluid is easily introduced into the fluid-receiving part.

The semicircular perpendicular holes 151-2 and 152-2 is configured to form a circular hole when the opposing pipes are inserted into the body of the pipe packing 100.

Each of the multiple semicircular horizontal holes 151-1 and 152-1 is formed to be spaced apart by a predetermined interval from each other along the circumferential direction of each of the opposite support pieces.

The first opposite flow passage holes 111-1 and 111-2, which communicate with the fluid-receiving part, are formed in the end parts of the opposite protruding jaws 111 and 112, respectively, so that fluid is easily introduced to the fluid-receiving part although end parts of the opposite protruding jaws 111 and 112 formed by protruding in the directions toward a center of the pipe packing 100 from the inner wall surface of the outer circumferential part 110 of the body come into contact with inner surfaces of the opposite inner circumferential parts 141 and 142, which are the inner surfaces of the body, due to the opposing pipes inserted into the body of the pipe packing 100.

Each of the first flow passage holes 111-1 and 111-2 is formed in a semicircular shape.

The second opposite flow passage holes 141-1 and 142-1 having semicircular shapes corresponding to the first opposite flow passage holes 111-1 and 111-2 of the opposite protruding jaws 111 and 112 are formed in the inner surfaces of the opposite inner circumferential parts 141 and 142, respectively. Accordingly, when the opposing pipes are inserted into the pipe packing 100, the opposing pipes come into contact with the opposite protruding jaws 111 and 112. The first opposite flow passage holes 111-1 and 111-2 of the opposite protruding jaws 111 and 112 and the second opposite flow passage holes of the inner surfaces of the opposite inner circumferential parts 141 and 142 form a circular shape when the opposing pipes are inserted into the pipe packing 100.

The multiple first opposite flow passage holes 111-1 and 111-2 and the multiple second opposite flow passage holes 141-1 and 142-1 are formed to be spaced apart by predetermined distances from each other along a circumferential direction of each of the inner surfaces of the opposite protruding jaws 111 and 112 and the opposite inner circumferential parts 141 and 142.

The first opposite flow passage holes 111-1 and 111-2 formed in the opposite protruding jaws 111 and 112 are configured to have the shape of a circular hole when the opposing pipes are inserted into the pipe packing 100.

When fluid flowing inside the opposing pipe leaks and is introduced to the fluid-receiving part through the first opposite flow passage holes 111-1 and 111-2, the high fluid pressure is formed inside the fluid-receiving part such that the opposite inner circumferential parts 141 and 142 are in close contact with the outer surface of the opposing pipes firmly, thereby making the pipe watertight.

Meanwhile, the mold assembly 3000 will be described hereinbelow.

The mold assembly includes the outer mold 3100 and the inner mold 3200, and a space between the outer mold and the inner mold is a core. Furthermore, molten rubber is injected into the core, which is the space between the outer mold 3100 and the inner mold 3200.

Referring to the outer mold 3100, the outer mold 3100 includes the upper outer mold 3110, the middle outer mold 3120, and the lower outer mold 3130.

When the upper outer mold 3110, the middle outer mold 3120, and the lower outer mold 3130 constituting the outer mold are combined with each other, the outer mold 3100 is formed in a shape of a cylinder having a space formed therein.

The upper outer mold 3110 is formed in a circular plate shape, and has an upper groove 3111 formed in a lower surface thereof.

The upper groove is formed to have a step.

The upper groove 3111 formed to have the step in the lower surface of the upper outer mold includes a first upper groove 3111-1 and a second upper groove 3111-2, wherein the diameter of the first upper groove 3111-1 is formed to be larger than the diameter of the second upper groove 3111-2.

That is, a groove formed in the lower surface of the upper outer mold 3110 is referred to as the first upper groove 3111-1, and a groove formed in the first upper groove 3111-1 is referred to as the second upper groove 3111-1.

The first upper groove 3111-1 is formed concavely.

A pair of upper holding jaws 3112 are formed to be symmetrical to each other inside the second upper groove 3111-2, each of the upper holding jaws 3112 being formed in a semicircular shape.

The middle outer mold 3120 is formed in a ring shape, and an inner circumference of the middle outer mold 3120 protrudes to become narrower in diameter toward the center portion of the outer mold 3100.

The lower outer mold 3130 is formed in a shape of a circular plate, and has a lower groove 3131 formed in an upper surface thereof.

The lower groove 3131 is formed to have a step.

The lower groove 3131 formed to have the step in the upper surface of the lower outer mold 3130 includes a first lower groove 3131-1 and a second lower groove 3131-2, the diameter of the first lower groove 3131-1 being formed to be larger than the diameter of the second lower groove 3131-2.

That is, a groove formed in a lower surface of the lower outer mold 3130 is referred to as the first lower groove 3131-1, and a groove formed in the first lower groove is referred to as the second lower groove 3131-2.

The first lower groove 3131-1 is formed concavely.

A pair of lower holding jaws 3132 are formed to be symmetrical to each other inside the second lower groove 3131-2, each of the lower holding jaws 3132 being formed in a semicircular shape.

Referring to the inner mold 3200, the inner mold includes the upper inner mold 3210, the middle inner mold 3220, and the lower inner mold 3230.

The upper inner mold 3210 includes an upper fixing part 3211 combined with the second upper groove 3111-2 of the upper outer mold 3110 and an upper body 3212 formed on a lower portion of the upper fixing part 3211.

The upper fixing part 3211 is formed in a shape of corresponding to the shape of the second upper groove 3111-2.

The upper body 3212 is formed in the shape of a circular plate and to become smaller in diameter from an upper portion thereof toward a lower portion thereof.

In addition, a plurality of upper rings 3213 are provided on an outer circumference of the upper body 3212.

The upper rings 3213 include three rings, which are the upper upper ring 3213-1, the middle upper ring 3213-2, and the lower upper ring 3123-3 provided from the upper portion toward the lower portion thereof.

Accordingly, the step 2 is formed on the outer surface of each of the opposite inner circumferential parts 141 and 142 of the pipe packing 100.

A sectional shape of each of the upper upper ring, the middle upper ring, and the lower upper ring is formed in a shape of a triangular ring.

A plurality of upper protrusions 3214 are radially formed at the lowest end of the outer circumference of the upper body 3212.

Each of the upper protrusions 3214 is formed in a semicircular shape.

The middle inner mold 3220 includes a middle body 3221 having a ring shape and a middle plate 3222 formed at a middle of the middle inner body 3221 which divides the middle body 3221 into an upper portion and a lower portion.

A plurality of upper semicircular jaws 3222-1 having semicircular shapes are radially formed on an edge of an upper surface of the middle plate 3222.

A plurality of upper triangular jaws 3222-2 having triangular shapes are radially formed on the edge of the upper surface of the middle plate between adjacent upper semicircular jaws 3222-1.

The plurality of upper semicircular jaws 3222-1 and the plurality of upper triangular jaws 3222-2 are disposed alternately along the edge of the upper surface of the middle plate 3222.

The upper semicircular jaw 3222-1 and the upper triangular jaw 3222-2 formed on the upper surface of the middle plate 3222 are combined with au upper portion of the inner circumference of the middle inner body 3221.

A plurality of lower semicircular jaws 3222-1 having semicircular shapes are radially formed on an edge of a lower surface of the middle plate 3222.

A plurality of lower triangular jaws 3222-2 having triangular shapes are radially formed on the edge of the lower surface of the middle plate 3222 between adjacent upper semicircular jaws 3222-1.

The plurality of upper semicircular jaws 3222-1 and the plurality of upper triangular jaws 3222-2 are disposed alternately along the edge of the upper surface of the middle plate 3222.

The lower semicircular jaw 3222-3 and the lower triangular jaw 3222-4 formed on the lower surface of the middle plate 3222 are combined with a lower portion of the inner circumference of the middle inner body 3221.

A lower ring 3223 having a ring shape is formed on a lower surface of the middle plate 3222.

An upper ring jaw 3221-1, a middle ring jaw 3221-2, and a lower ring jaw 3221-3 are formed on the outer circumference of the middle inner body 3221, wherein the upper ring jaw 3221-1, the middle ring jaw 3221-2, and the lower ring jaw 3221-3 are formed to be spaced apart by a predetermined distance from each other.

Furthermore, an upper outer triangular jaw 3221-4 is formed between the upper ring jaw 3221-1 and the middle ring jaw 3221-2, and a lower outer triangular jaw 3221-5 is formed between the middle ring jaw 3221-2 and the lower ring jaw 3221-3.

The upper outer triangular jaw 3221-4 and the lower outer triangular jaw 3221-5 are radially formed in plural.

In addition, the first flow passage holes and the second flow passage holes of the pipe packing 100 are formed by the upper triangular jaw 3222-2, the lower triangular jaw 3222-4, the upper outer triangular jaw 3221-4, and the lower outer triangular jaw 3221-5.

The lower inner mold 3230 includes a lower fixing part 3231 combined with the second lower groove 3131-2 of the lower outer mold 3130 and a lower body 3232 formed on an upper portion of the lower fixing part 3231.

The lower fixing part 3231 is formed in a shape of corresponding to the shape of the second lower groove 3131-2.

The lower body 3232 is formed in the shape of a circular plate and to become smaller in diameter from the lower portion toward the upper portion thereof.

In addition, a plurality of lower rings 3233 are formed on an outer circumference of the lower body 3232.

The lower rings 3233 include three rings, which are a lower lower ring 3233-1, a middle lower ring 3233-2, and an upper lower ring 3233-3 provided from the lower portion to the upper portion thereof.

Accordingly, the step 2 is formed on the outer surface of each of the opposite inner circumferential parts 141 and 142 of the pipe packing 100.

A sectional shape of each of the lower lower ring 3233-1, the middle lower ring 3233-2, and the upper lower ring 3233-3 is formed in a shape of a triangular ring.

A plurality of lower protrusions 3233-4 are radially formed on an uppermost end of the outer circumference of the lower body 3232.

Each of the lower protrusions 3233-4 is formed in a semicircular shape.

In addition, a through hole having a circular shape, which passes through the lower fixing part 3231 and the lower body 3232, is formed in the lower inner mold 3230.

Meanwhile, the upper inner mold 3210, the middle inner mold 3220, and the lower inner mold 3230 are combined with the inside of the outer mold 3100 and are not rotated.

The upper inner mold 3210 is prevented from being rotated by being combined with the upper outer mold 3110, and the lower inner mold 3230 is prevented from being rotated by being combined with the lower outer mold 3130. Furthermore, a pillar protrudes from the upper inner mold 3210 or the lower inner mold 3230, and is combined with the middle inner mold 3120, so that the middle inner mold 3120 is prevented from rotating, and the pillar also functions as a guide.

In addition, the upper protrusion of the upper inner mold 3210 and the upper semicircular jaw 3222-1 of the middle inner mold 3220 are located in a straight line to overlap each other in a plan view, the upper semicircular jaw 3222-1 and the lower semicircular jaw 3222-3 of the middle inner mold 3220 are located in a straight line to overlap each other in a plan view, and the lower semicircular jaw 3222-3 of the middle inner mold 3220 and the lower protrusion of the lower inner mold 3230 are also located in a straight line to overlap each other in a plan view.

Accordingly, the horizontal holes 151-1 and the perpendicular holes 151-2 of the pipe packing 100 are formed by the upper protrusions of the upper inner mold 3210 and the upper semicircular jaws 3222-1 of the middle inner mold 3220.

Accordingly, the watertight pipe packing member of the present inventive concept includes a fluid-receiving part, which is a space receiving fluid leaked initially, so that fluid is not leaked to the outside. In addition, pressure of the fluid-receiving part is increased by the initially leaked fluid received in the fluid-receiving part to increase watertightness of the pipe packing. Accordingly, fluid can be prevented from leaking continuously, and the watertightness can be more efficiently maintained due to the fluid-receiving part formed at opposite ends of the pipe packing.

The invention claimed is:

1. A method of manufacturing a pipe packing inserted into a housing having a hollow body shape to prevent fluid flowing inside a pipe from leaking to the outside, the method comprising:
   manufacturing the pipe packing by injecting molten rubber into a mold assembly having an outer mold and an inner mold,
   wherein the pipe packing comprises:
   an outer circumferential part located outside of the pipe relative thereto;
   opposite surfaces provided in directions toward a middle of the pipe packing at opposite ends of the outer circumferential part; and
   an inner circumferential part provided toward a center portion of the opposite surfaces therefrom, wherein the inner circumferential part has a gap provided therein to be divided into opposite inner circumferential parts, so entering and exiting of the fluid are performed through the gap,
   wherein the outer circumferential part is symmetrical relative to the center portion, a diameter thereof becoming smaller toward the center portion from opposite sides thereof, and has an inclination surface at each of the opposite sides, and opposite protruding jaws are provided in the directions toward the middle of the pipe packing on an inner wall surface of the outer circumferential part, so each of ends of the opposite protruding jaws is in contact with an inner wall surface of the inner circumferential part, and
   the mold assembly includes the outer mold and the inner mold, wherein space between the outer mold and the inner mold is a core, and the molten rubber is injected into the core which is the space between the outer mold and the inner mold,
   the outer mold is composed of an upper outer mold, a middle outer mold, and a lower outer mold, wherein, when the upper outer mold, the middle outer mold, and the lower outer mold constituting the outer mold are combined with each other, the outer mold is configured in a shape of a cylinder having a space provided therein, and the upper outer mold is configured in a circular plate shape and has an upper groove provided in a lower surface thereof, the upper groove being configured to have a step,
   the upper groove configured to have the step in the lower surface of the upper outer mold includes a first upper groove and a second upper groove, a diameter of the first upper groove being configured to be larger than a diameter of the second upper groove, wherein a groove provided in the lower surface of the upper outer mold is referred to as the first upper groove, and a groove provided in the first upper groove is referred to as the second upper groove, the first upper groove being configured concavely, wherein a pair of upper holding jaws are configured to be symmetrical to each other inside the second upper groove, each of the upper holding jaws being configured in a semicircular shape, and
   the middle outer mold is configured in a ring shape, an inner circumference of the middle outer mold protruding to become narrower in diameter toward the center portion, and has a lower groove provided in an upper surface thereof, wherein the lower groove is configured to have a second step, and the lower groove configured to have the second step in an upper surface of the lower outer mold is composed of a first lower groove and a second lower groove, a diameter of the first lower groove being configured to be larger than a diameter of the second lower groove, wherein a groove provided in a lower surface of the lower outer mold is referred to as the first lower groove, and a groove provided in the first lower groove is referred to as the second lower groove, the first lower groove being configured concavely, wherein a pair of lower holding jaws are configured to be symmetrical to each other inside the second lower groove, each of the lower holding jaws being configured in a semicircular shape.

* * * * *